United States Patent [19]
Roach

[11] Patent Number: 4,508,597
[45] Date of Patent: Apr. 2, 1985

[54] RECOVERY OF ORGANIC SOLVENTS FROM LIQUID MIXTURES

[75] Inventor: Jack W. Roach, Oklahoma City, Okla.

[73] Assignee: Kerr-McGee Refining Corporation, Oklahoma City, Okla.

[21] Appl. No.: 366,040

[22] Filed: Apr. 5, 1982

[51] Int. Cl.³ .............................................. B01D 3/38
[52] U.S. Cl. ........................................ 203/79; 203/85; 203/95; 208/356; 208/361; 208/367; 585/835
[58] Field of Search ....................... 203/76, 79, 83, 85, 203/95-97, 42-46; 208/308, 347, 350, 356, 361, 362, 363, 367; 585/800, 833, 835, 867

[56] References Cited

U.S. PATENT DOCUMENTS

| | | | |
|---|---|---|---|
| 2,166,160 | 4/1939 | King ................................ | 196/13 |
| 2,222,347 | 11/1940 | Gard et al. ..................... | 208/367 |
| 2,242,173 | 7/1941 | Buckley ........................... | 62/175.5 |
| 2,391,576 | 10/1945 | Katz et al. ...................... | 196/73 |
| 2,391,607 | 8/1945 | Whaley ............................ | 196/88 |
| 2,596,785 | 4/1952 | Nelly et al. ..................... | 48/190 |
| 2,886,610 | 5/1959 | Georgian ......................... | 203/83 |
| 2,940,920 | 12/1960 | Garwin ............................ | 208/45 |
| 3,607,716 | 5/1971 | Roach .............................. | 208/8 |
| 3,607,717 | 8/1971 | Roach .............................. | 208/8 |
| 3,969,196 | 5/1976 | Zosel ............................... | 203/49 |
| 4,273,644 | 6/1981 | Harris et al. ................... | 208/309 |
| 4,305,814 | 12/1981 | Leonard .......................... | 208/321 |

OTHER PUBLICATIONS

Description in Prior Art Statement of Steam Stripping Conducted in Multi-Tray Vessel.

*Primary Examiner*—Frank Sever
*Attorney, Agent, or Firm*—William G. Addison

[57] ABSTRACT

A method of recovering light organic solvent from a liquid mixture containing the solvent and a product material, such as asphaltenes or coal liquefaction products. The solvent-product material mixture is treated to separate a first vapor phase rich in solvent and a first liquid phase rich in product material. The first liquid phase is then intimately contacted with steam, under shearing conditions, in a static or dynamic mixer. The steam-liquid phase mixture is then treated to separate a second vapor phase, rich in steam and solvent, and a second liquid phase, rich in product material and substantially depleted of solvent. Solvent is recovered from the first and second vapor phases.

15 Claims, 2 Drawing Figures

RECOVERY OF ORGANIC SOLVENTS FROM LIQUID MIXTURES

FIELD OF THE INVENTION

The present invention relates to methods of recovering light organic solvents from liquid mixtures, and more particularly to such methods in which the liquid mixture contains a product material of high molecular weight, such as asphaltene or solvent refined coal.

DESCRIPTION OF THE PREFERRED EMBODIMENTS

Figure 1:
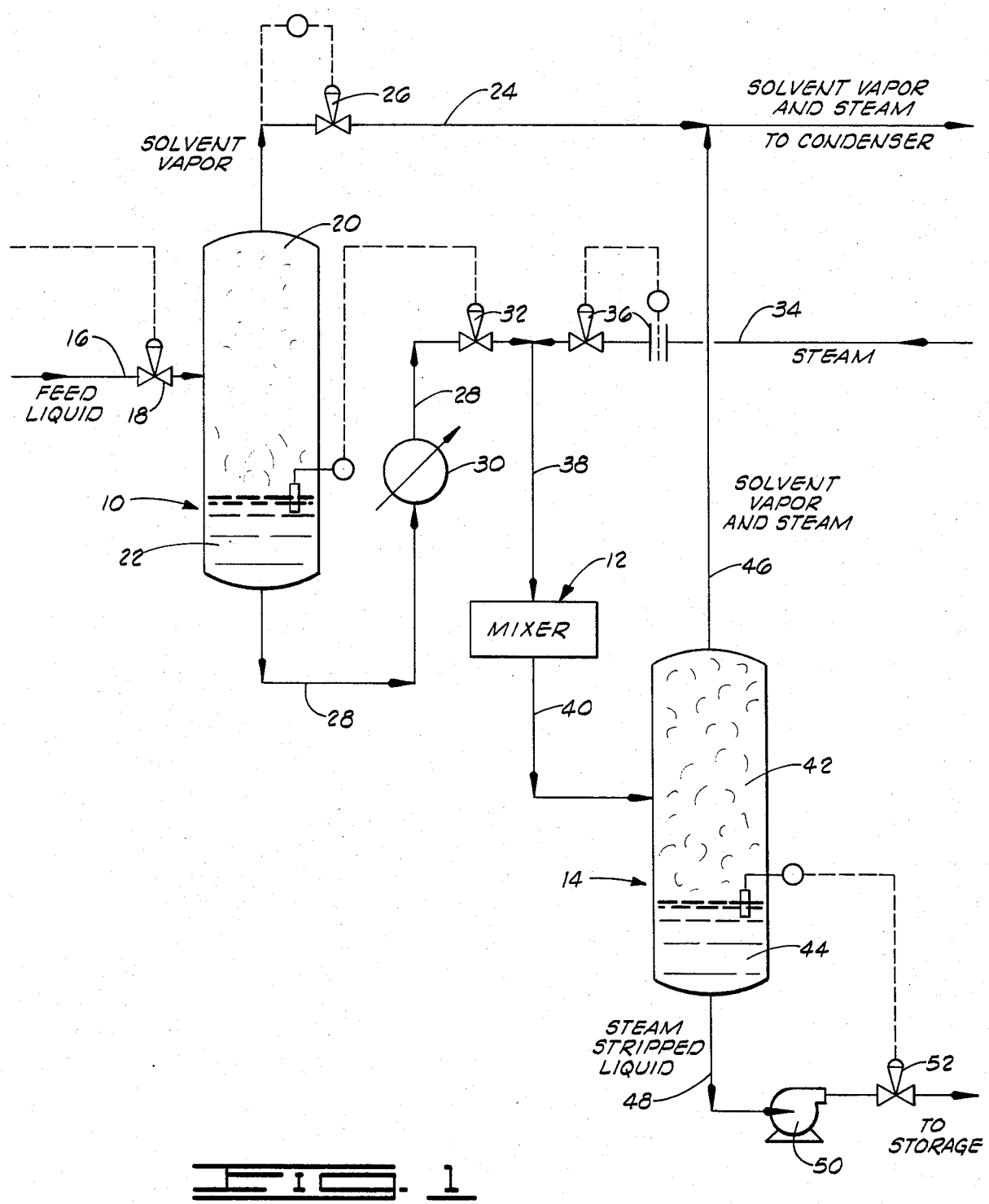
FIG. 1 shows the flow of materials in the method of the present invention.

The method of the present invention relates to the recovery of a light organic solvent from a liquid mixture of solvent and a product material. The method is believed to offer particular advantages in the separation of solvent from the liquid products of supercritical solvent extraction processes. Such processes have found application in the separation of asphalt-type bituminous materials, as described in U.S. Pat. No. 2,940,920, and in the separation of liquefied coal products, as described in U.S. Pat. No. 3,607,717. Such processes generally result in production of a liquid mixture containing a high molecular weight product material and a light organic solvent, at a pressure above the critical pressure of the solvent, and possibly at a temperature above the critical temperature of the solvent.

As described in greater detail in U.S. Pat. No. 2,940,920, the solvent used in separation of asphalt-type bituminous material is preferably a paraffinic hydrocarbon having between about 3 and about 8 carbon atoms, such as pentane; in this process a liquid mixture is produced which contains this solvent and an asphaltene product material. As described in greater detail in U.S. Pat. No. 3,607,717, the solvent used in separation of liquefied coal products is preferably an aromatic cyclic compound having between about 5 and about 9 carbon atoms, such as pyridine, benzene, toluene, or xylene; in this process, a liquid mixture is produced which contains this solvent and coal liquefaction products.

In supercritical solvent extraction processes used for both liquefied coal and for asphalt-type bituminous materials, it is desirable to effect the maximum feasible separation of solvent from product material. Particularly in solvent refined coal processes, the solvent may be expensive; recovery of the solvent from product material is necessary if the process is to be economically efficient. Furthermore, traces of the unremoved solvent in the product material may flash at such low temperatures as to make the product material unsuitable for some applications. Recovery of the solvent is necessary if the product material is to be available for a broad range of end uses.

With high molecular weight product materials, such as asphaltenes and coal liquefaction products, the solvent-product material mixture is generally a highly viscous mixture at lower temperatures. The high viscosity renders it difficult to effectively strip the solvent from the solvent-product mixture using conventional steam stripping techniques. While viscosity of the mixture can be reduced to some extent by raising the temperature of the mixture, the temperature cannot be raised any higher than that at which the product material begins to thermally decompose, by polymerization, cracking or other chemical reactions. In general, these product materials begin thermal decomposition at temperatures substantially below their boiling points. Even near the temperature at which the product material begins to undergo thermal decomposition, the mixture may remain so viscous as to prevent complete separation of solvent by conventional steam stripping techniques.

The method of the present invention effects the recovery of light organic solvents from a liquid mixture containing the solvent and a product material, which may comprise a high molecular weight substance such as asphaltene or solvent refined coal. With reference to FIG. 1, feed liquid, comprising the solvent-product material mixture, is received in a first solvent separation zone 10. In the first solvent separation zone 10, a first vapor phase rich in solvent is separated from a first liquid phase rich in product material. The first vapor phase is released from the first solvent separation zone 10 and transferred to a condenser (not shown), where solvent is recovered.

The first liquid phase is transferred to a mixing zone 12, where it is intimately contacted with steam, under shearing conditions, to produce a steam-liquid phase mixture. This steam-liquid phase mixture is transferred to a second solvent separation zone 14, where a second vapor phase, rich in steam and solvent vapor, is separated from a second liquid phase, which is rich in product material. The second vapor phase is released from the second solvent separation zone 14, and transferred to a condenser (not shown), where solvent is recovered. The second liquid phase, now substantially free of solvent, is withdrawn from the second solvent separation zone 14. Given this overview of the method of the present invention, a more detailed description will now be provided.

With continued reference to FIG. 1, feed liquid, comprising solvent-product material mixture, is received in the first solvent separation zone 10 through a conduit 16; flow of the mixture in the conduit 16 is controlled by a valve 18. Feed liquid is received in the conduit 16 from a source vessel (not shown); in the event that the method of the present invention is used in conjunction with a critical solvent extraction process, then the source vessel will ordinarily comprise a supercritical settling vessel, which is maintained at a pressure above the critical pressure of the solvent, and which may also be maintained at a temperature above the critical temperature of the solvent.

As indicated by the dashed line in FIG. 1, the valve 18 is preferably a level control valve responsive to the liquid level in the source vessel. As the liquid level rises in the source vessel, the valve 18 is opened to permit feed liquid to flow through the conduit 16 into the first solvent separation zone 10; as the liquid level falls in the source vessel, flow of feed liquid into the first solvent separation vessel 10 is stopped by closure of the valve 18.

The first solvent separation zone 10 preferably comprises a closed equilibrium vessel which is maintained at a pressure substantially below that of the source vessel. Furthermore, the first solvent separation zone 10 preferably is also maintained at a pressure above that of the second solvent separation zone 14. Solvent-product material received in the first solvent separation zone thus undergoes a reduction of pressure, which causes the solvent-product material mixture to separate into a first vapor phase 20, rich in solvent vapors, and a first liquid phase 22, rich in product material but also containing residual quantities of solvent. The solvent-product material mixture remains in the first solvent separation zone 10 for a residence time sufficient to permit this separation to take place.

After the first vapor phase 20 and first liquid phase 22 have separated, the first vapor phase 20 is withdrawn from the top of the first solvent separation zone 10 through a conduit 24. Flow of solvent vapor in the conduit 24 is controlled by a valve 26, which preferably comprises a back pressure control valve which maintains the first solvent separation zone 10 at an elevated pressure, as required to maintain a pressure gradient relative to the second solvent separation zone 14, for reasons to be detailed hereafter. Solvent vapors flow through the conduit 24 to a condenser (not shown), where liquid solvent is recovered and subsequently recycled.

The first liquid phase 22 is withdrawn from the bottom of the first solvent separation zone 10 into a conduit 28. In the embodiment shown in FIG. 1, the second solvent separation zone 14 is maintained at a lower pressure than the first solvent separation zone 10; thus, the pressure gradient causes the flow of the first liquid phase 22 into the conduit 28. Alternately, in the event that the necessary pressure differential is lacking, a pump may be installed in the conduit 28 in order to effect the transfer of the first liquid phase 22 from the first solvent separation zone 10. Such a pump will preferably be located between the first solvent separation zone 10 and the heat exchanger 30, to be described hereafter. If the pump were to intake heated liquid from the heat exchanger 30, rather than cooler liquid from the first solvent separation zone 10, then the pump would also have to be capable of handling vapors produced by the increase in temperature; placement of a pump "upstream" of the heat exchanger 30—that is, between the first solvent separation zone 10 and the heat exchanger 30—eliminates the requirement that the pump have a vapor handling capacity.

The flow of the first liquid phase 22 in the conduit 28 is controlled by a valve 32 which preferably comprises a level control valve responsive to the liquid level in the first solvent separation zone 10. Thus, an increase in the level of the first liquid phase 22 in the first solvent separation zone 10 causes the valve 32 to open, and thus allows the first liquid phase to flow in the conduit 28. A decrease of liquid level in the first solvent separation zone 10 correspondingly causes the valve 32 to close.

While in the conduit 28, the first liquid phase 22 flows through the heat exchanger 30, which maintains the first liquid phase 22 at a temperature permitting the first liquid phase 22 to remain flowable. The heat exchanger 30 operates to heat the first liquid phase, and thus decreases the viscosity of the first liquid phase 22 prior to its introduction in the mixing zone 12. This reduction in viscosity renders the first liquid phase more flowable, and thus increases the speed and efficiency with which the method of the present invention may be carried out. Furthermore, the reduction in viscosity permits more complete mixing of the first liquid phase with steam during the mixing step, to be described hereafter, and thus enhances the degree of solvent recovery offered by the method of the present invention.

The heat exchanger 30 preferably raises the temperature of the first liquid phase 22 to a temperature near, but not in excess of, the temperature at which the product material begins to undergo thermal decomposition. When the product material comprises asphaltenes, the heat exchanger 30 preferably heats the first liquid phase 22 to between about 500° F. and about 550° F. When the product material comprises coal liquefaction products, the heat exchanger 30 preferably heats the first liquid phase 22 to between about 600° F. and about 700° F.

It should be understood that a heat exchanger 30 is not necessarily needed for practice of the present invention. In the event that the first solvent separation zone 10 is maintained at a temperature sufficiently high to impart the described viscosity characteristics to the first liquid phase 22, then the heat exchanger 30 may be dispensed with.

With continued reference to FIG. 1, a stripping gas, such as steam, flows through a conduit 34. Although light hydrocarbons, such as methane or natural gas, may be suitable stripping gases in some applications of the present invention, steam is regarded as the preferable stripping gas. Thus, the following description will make reference to steam as the stripping gas; however, it should be understood that other stripping gases may be employed in like manner.

The steam flowing in the conduit 34 is substantially dry—that is, substantially free of globules of liquid water. This drying is preferably accomplished by superheating the steam. The rate of flow of steam in the conduit 34 is controlled by a rate control valve 36.

The steam in the conduit 34 and the first liquid phase 22 in the conduit 28 are combined in a header (not shown), and flow concurrently through a conduit 38 to the mixing zone 12. The mixing zone 12 preferably comprises either a static or a dynamic (mechanical) mixing device. In the mixing zone 12, the steam and the first liquid phase 22 are intimately contacted, under shearing conditions. This combination of mixing and shearing effects a reduction in the viscosity of the first liquid phase, and thus promotes transfer of the residual solvent to the surface of the first liquid phase, as required for removal of the solvent by the steam. It is believed that the degree of mixing provided by this step is sufficient to provide a separation of solvent approaching one theoretical tray efficiency.

The mixing step just described produces a steam-liquid phase mixture which flows through the conduit 40 to the second solvent separation zone 14, which preferably comprises an equilibrium vessel similar in construction to the first solvent separation zone 10. In the second solvent separation zone 14 the steam-liquid phase mixture is retained for a residence time sufficient to permit separation of the mixture into a second vapor phase 42, rich in steam and solvent vapor, and a steam stripped second liquid phase 44, rich in product material and substantially depleted in unwanted solvent components. The temperature in the second solvent separation zone 14 is sufficient to maintain the product material in a liquid state, but not above the temperature at which the product material begins to undergo thermal decomposition.

The second vapor phase 42 is withdrawn from the top of the second solvent separation zone 14 and flows through a conduit 46 and into conduit 24. In the conduit 24, the steam and solvent vapors flow to the condenser discussed previously, where liquid solvent is recovered and thereafter recycled.

The second liquid phase 44 is withdrawn from the bottom of the second solvent separation zone 14 and flows into a conduit 48. In the embodiment shown in FIG. 1, a pump is provided in order to power the flow of liquid in the conduit 48. However, in the event that the pressure in the first solvent separation zone 10 exceeds the pressure in the second solvent separation zone 14 by a sufficient amount, it is possible that no pump will be required; in this event, the pressure differential will power flow of liquid from the second solvent separation zone 14 and into the conduit 48.

The conduit 48 connects the second solvent separation zone 14 with a storage zone (not shown), where the second liquid phase may be collected and stored. Flow of liquid in the conduit 48 is controlled by a valve, which is preferably a level control valve responsive to the liquid level in the second solvent separation zone 14. Thus, when the level of the second liquid phase 44 rises in the second solvent separation zone 14, the valve 52 opens and allows flow of liquid from the second solvent separation zone 14 to the storage zone. When the liquid level lowers in the second solvent separation zone 14, the valve 82 correspondingly closes.

Figure 2:
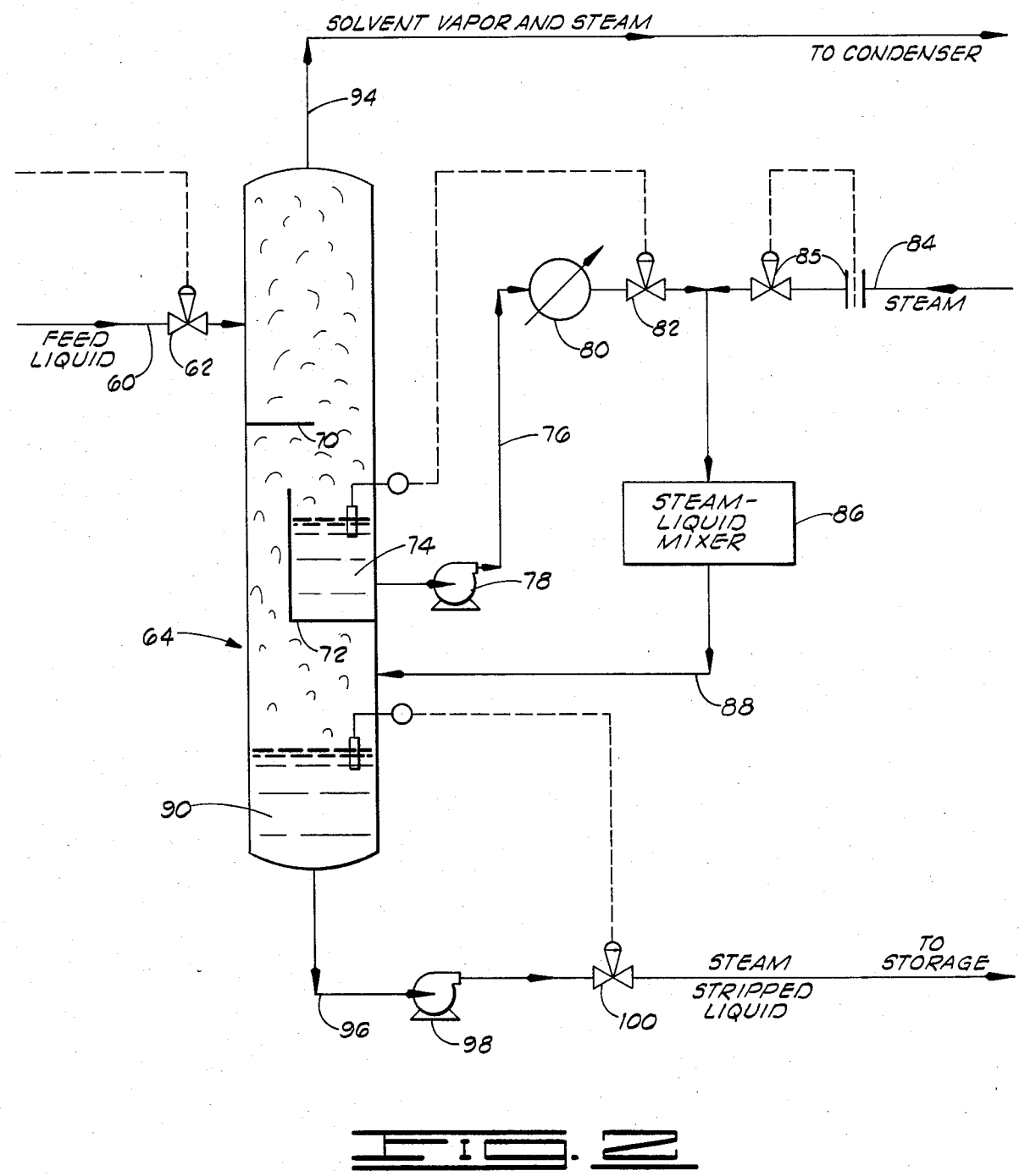
FIG. 2 shows the flow of materials in another embodiment of the method of the present invention, in which the first and second solvent separation zones are disposed within a single vessel.

FIG. 2 shows another embodiment of the present invention. In many respects, this embodiment is similar to that described with reference to FIG. 1. A feed liquid, comprising a solvent-product material mixture flows from a source vessel (not shown) through a conduit 60. A valve 62, preferably a level control valve responsive to liquid level in the source vessel, controls the flow of liquid in the conduit 60. The mixture flows through the conduit 60 into an equilibrium vessel 64.

After it is introduced into the equilibrium vessel 64, solvent-product material mixture may flow over one or more of side-by-side pans 70 (of which one is shown in FIG. 2), in order to bring about further mixing of the solvent-product material mixture. Other types of mixing devices, such as shed decks, sieve trays or bubble trays, could be employed to effect mixing in lieu of the pan shown in FIG. 2.

A total draw pan 72 is provided in an intermediate section of the equilibrium vessel 64, beneath the pan 70; the total draw pan 72 collects all of the liquid flowing downward from the pan 70. While the solvent-product material mixture flows over the pan or pans 70, and while it resides in the total draw pan 72, it separates into a first vapor phase, rich in solvent, and a first liquid phase 74, rich in product material but also containing residual quantities of solvent. This separation, or flashing, of solvent occurs because the equilibrium vessel 64 is maintained at a lower pressure than the source vessel, much as was the case in the embodiment described with reference to FIG. 1.

From the description thus far provided, it will be appreciated that the total draw pan 72 and the upper portions of the equilibrium vessel 64 function as a first solvent separation zone in which a first vapor phase is separated from a first liquid phase 74. As will become clear hereafter, the equilibrium vessel 64 houses the second solvent separation zone as well.

After the first liquid phase 74 has been resident in the equilibrium vessel 64 for a time sufficient to permit the separation of the first vapor phase just described, the first liquid phase 74 is withdrawn from the total draw pan 72, out of the equilibrium vessel 64, and into a conduit 76. Since the first and second solvent separation zones are both housed in the same vessel, there is no pressure differential to power transfer of the first liquid phase 74. Thus a pump 78 is provided to power transfer of the first liquid phase 74 in the conduit 76.

With continued reference to FIG. 2, the first liquid phase 74 flows via the conduit 76 through a heat exchanger 80, if heating is required to decrease the viscosity of the first liquid phase in a flowable state. Flow in the conduit 76 is controlled by a valve 82, responsive to the liquid level in the total draw pan 72. Steam flowing in a conduit 84, which flow is controlled by a valve 85, is combined with the first liquid phase 74 flowing in the conduit 76. The steam and first liquid phase are intimately contacted, under shearing conditions, in a mixing zone 86, to produce a steam-liquid phase mixture. These steps are identical to those previously described with reference to FIG. 1.

The steam-liquid phase mixture flows via conduit 88 into the lower portion of the equilibrium vessel 64. The steam-liquid phase mixture falls to the bottom of the equilibrium vessel 64, and remains for a residence time sufficient to permit separation of a second vapor phase, rich in steam and solvent vapor, and a steam stripped second liquid phase 90, rich in product material and substantially depleted of solvent. Thus, it will be appreciated that the lower portion of the equilibrium vessel 64 functions as a second solvent separation zone.

The first and second vapor phases are withdrawn from the top of the equilibrium vessel 64 as a single vapor stream. The vapor stream flows through conduit 94 to a condenser (not shown), where liquid solvent is recovered and thereafter recycled. The second liquid phase 90 is drawn into a conduit 96 by a pump 98, and flows to a storage zone (not shown). Flow of the second liquid phase in the conduit 96 is controlled by a valve 100, which is responsive to the liquid level in the bottom of the equilibrium vessel 64.

From the foregoing description, it will be appreciated that the embodiment of FIG. 2 provides an effective system for recovery of light organic solvents in which only a single equilibrium vessel is required. In some instances, the system of FIG. 2 may provide a less expensive system than that described in FIG. 1, which provides for two separate equilibrium vessels.

Another embodiment, not shown in the Figures, is similar to that described with reference to FIG. 2. In this embodiment however, the first liquid phase is permitted to fall to the bottom of the equilibrium vessel 64, where it is drawn into the conduit interconnecting the mixing zone and the equilibrium vessel. The steam-first liquid phase mixture is transferred from the mixing zone to the bottom of the equilibrium vessel, where the second liquid phase intermixes with the first liquid phase. The first and second liquid phase mixture is then drawn off from the bottom of the vessel. Since a portion of the first liquid phase, still containing residual solvents, will be withdrawn from the bottom of the equilibrium vessel together with the second liquid phase, this embodiment of the process results in a less complete recovery of solvent than those embodiments described with reference to FIGS. 1 and 2. However, this embodiment may produce satisfactory results in those applications not demanding an extremely high degree of solvent recovery.

From the foregoing description, it will be appreciated that the method of the present invention provides an efficient and economical method of recovering light organic solvents from liquid mixtures of solvent and product material. The method offers particular advantages with high viscosity product material from which solvent is not easily recovered. The method thus offers enhanced economy by permitting the recovery and recycling of greater quantities of solvent, and further offers a more desirable product material, containing little, if any of the unrecovered solvent which has heretofore been a disadvantage in some end use activities.

Changes may be made in the construction, operation and arrangement of the various parts, elements, steps and procedures described herein without departing from the spirit and scope of the invention as defined in the following claims.

What is claimed is:

1. A method of recovering light organic solvent from a liquid mixture containing the light organic solvent and a high molecular weight product material of supercritical solvent extraction processes, comprising:
    treating the solvent-product material mixture in a first solvent separation zone to separate a first vapor phase rich in solvent and a first liquid phase rich in high molecular weight product material;
    recovering solvent from the first vapor phase;
    intimately contacting the first liquid phase with steam, under shearing conditions sufficient to provide a separation of solvent approaching up to one theoretical tray, in a mixing zone to produce a steam-liqud phase mixture;
    treating the steam-liquid phase mixture in a second solvent separation zone to separate a second vapor phase rich in steam and solvent and a second liquid phase rich in high molecular weight product material; and
    recovering solvent from the second vapor phase.

2. The method of claim 1, further comprising:
    maintaining the first liquid phase at a temperature permitting the first liquid phase to remain flowable, said temperature being below that at which the product material begins thermal decomposition.

3. The method of claim 1, further comprising:
    decreasing the viscosity of the first liquid phase, prior to introducing it into the mixing zone, by heating the first liquid phase to a temperature below that at which it begins thermal decomposition.

4. The method of claim 1 in which the treatment step in the first solvent separation zone is carried out by reducing pressure on the solvent-product material mixture.

5. The method of claim 4, further comprising:
    decreasing the viscosity of the first liquid phase, prior to introducing it into the mixing zone, by heating the first liquid phase to a temperature below that at which it begins thermal decomposition.

6. The method of claim 1 in which the steam and the first liquid phase flow concurrently into the mixing zone.

7. The method of claim 1 in which the steam introduced into the mixing zone is either dry or superheated.

8. The method of claim 1 in which the first and second solvent separation zones are disposed within a single enclosed vessel and in which the first and second vapor phases are released from the vessel in a single vapor stream.

9. The method of claim 1, further comprising:
    withdrawing the second liquid phase from the second solvent separation zone.

10. The method of claim 8 in which the treatment step in the first solvent separation zone is carried out by reducing pressure on the solvent-product material mixture.

11. The method of claim 1 in which the product material is characterized as undergoing thermal decomposition at a temperature substantially below its boiling point.

12. The method of claim 1 in which the product material comprises asphaltenes.

13. The method of claim 12 in which the solvent comprises a paraffinic hydrocarbon having between about 3 and about 8 carbon atoms.

14. The method of claim 1 in which the product material comprises coal liquefaction products.

15. The method of claim 14 in which the solvent comprises an aromatic cyclic compound having between about 5 and about 9 carbon atoms.

* * * * *